Oct. 18, 1955     J. SNYDER     2,721,315
DIRECTIONAL SOUND DETECTOR
Filed April 14, 1953     2 Sheets-Sheet 1
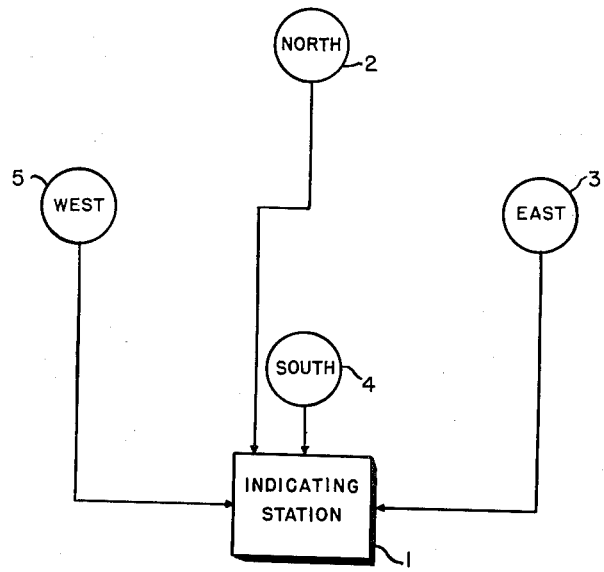
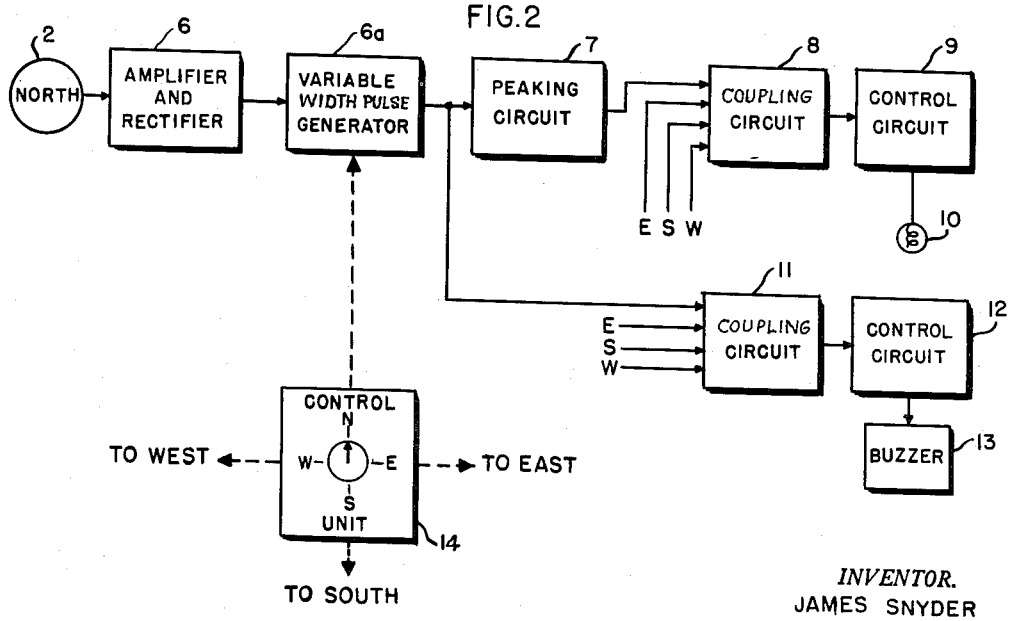
INVENTOR.
JAMES SNYDER
BY
Harry M. Saragovitz
Attorney

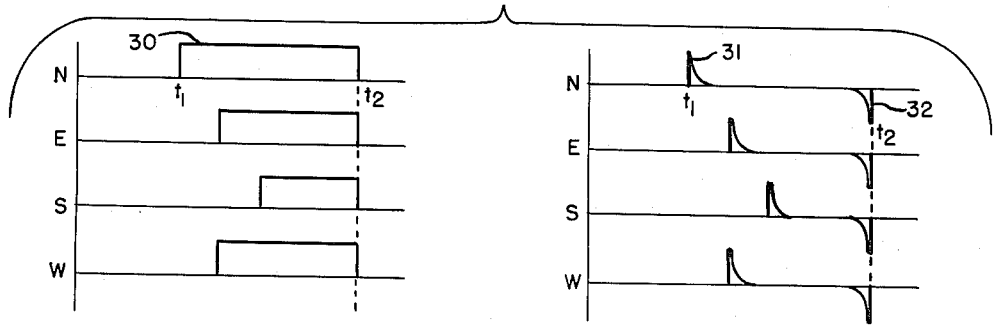
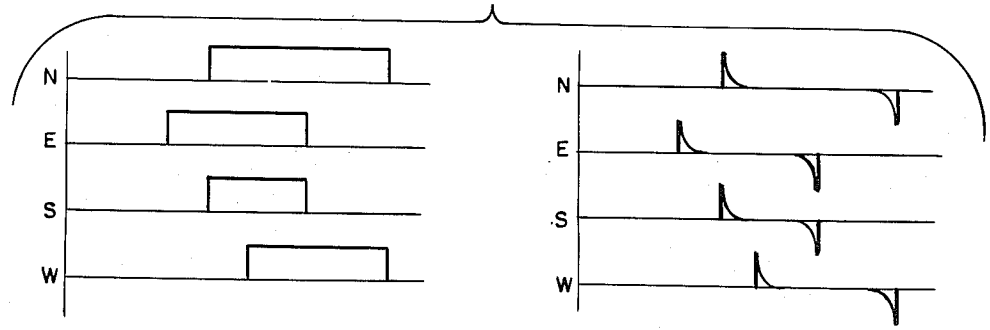
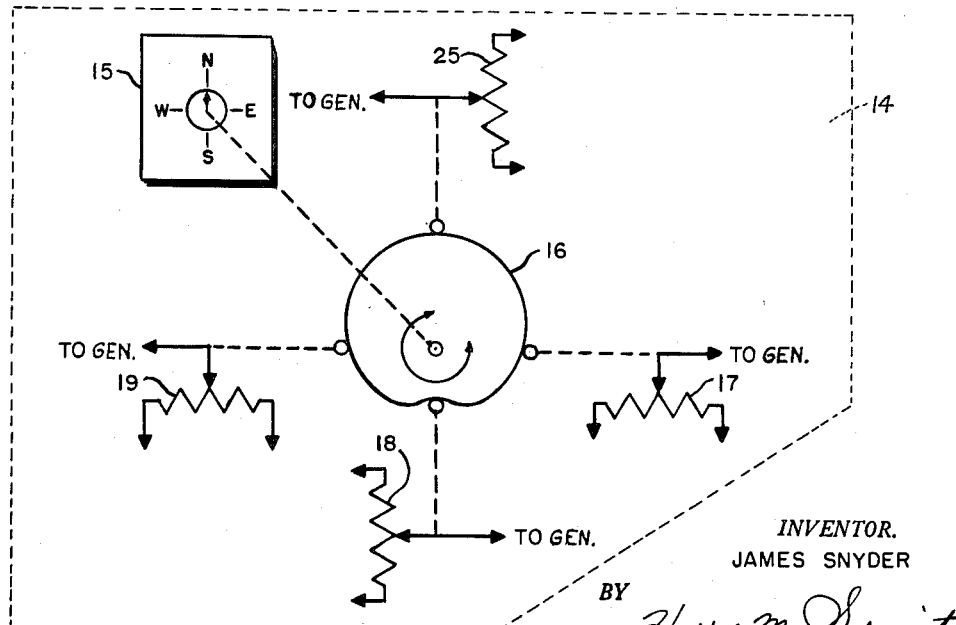

United States Patent Office 2,721,315
Patented Oct. 18, 1955

2,721,315

DIRECTIONAL SOUND DETECTOR

James Snyder, Asbury Park, N. J., assignor to the United States of America as represented by the Secretary of the Army Application April 14, 1953, Serial No. 348,842

13 Claims. (Cl. 340—6)

(Granted under Title 35, U. S. Code (1952), sec. 266)

The invention described herein may be manufactured and used by or for the Government for governmental purposes without the payment of any royalty thereon.

This invention relates to a new type of apparatus for determining the presence and direction of sonic energy.

Sound direction finders have taken several forms in the past. Some of them have depended upon directional microphones having certain angular relationships to provide the bearing of a train of sound waves. Other sound detectors have utilized several spaced microphones connected to apparatus that determines the time required for the sound waves to travel between such microphones. From such time intervals, the direction of the sound waves could be determined. The patents to Munson and Steinberg, 2,418,136 and Keiser and Weinstein, 2,573,748 illustrate typical systems of a long development program including the present invention; in such systems a somewhat temporary magnetic recording is made and soon erased so that further recordings can be made on the same magnetic medium, unless the operator stops further recording to make a detailed analysis.

The present invention somewhat resembles the latter type of system and may be used alone or in combination therewith as a preliminary warning device to indicate that accurate readings should be taken. When used in combination some of the components may be common to both systems, and if the device to take accurate readings requires that the recording be stopped until such readings are completed, the present device can also be used to stop the recording. In the present invention there is no electromechanical optical system and therefore the device can be of very simple construction. It has substantial psychological advantage since it operates only upon the arrival of sound waves from a desired direction and consequently the strain of continuous observation by the operator is alleviated.

Fig. 1 shows the overall sound locating system in block form;

Fig. 2 shows one of the microphones and its associated circuits in diagrammatic block form;

Figs. 3a and 3b illustrate curves helpful in explaining the operation of the invention; and Fig. 4 shows one embodiment that may be utilized for the control unit of Fig. 2.

In general, the invention comprises spaced microphones connected to a central indicating station. The apparatus is arranged to operate an indicating device when sound waves arrive from a predetermined broad sector and an additional indicating device when sound waves arrive from a predetermined narrow sector.

Examining the invention in more detail, Fig. 1 shows the entire system which includes a plurality of microphones and their interconnections to an indicating station. Indicating station 1, which may be placed in any convenient location, is connected to microphones 2, 3, 4 and 5, respectively designated north, east, south and west microphones. Preferably, four microphones as shown in this embodiment are utilized, but it should be understood that the invention is not to be limited to this number of microphones or to the spacing as shown, the only requirement being the use of at least two spaced microphones. It should be noted that if the minimum number is used, sound waves from two directions will give the same indication, making necessary other apparatus to provide an indication of the general direction of the waves.

Referring to Fig. 2, north microphone 2 and its associated circuits are shown in detail. Signals from microphone 2 are coupled to variable pulse width generator 6a, which may take the form of a multivibrator, through an amplifier and a full wave rectifier 6. Output pulses from generator 6a are fed to a peaking circuit 7, whose output is coupled through a coupling circuit 8 to control circuit 9. Peaking circuit 7 may be any one of a number of commonly known pulse shaping circuits such as a differentiator. The coupling circuit 8, which also receives the output pulses from other peaking circuits may consist of any conventional circuitry that will couple a plurality of signals to a single circuit. A variety of suitable circuits for the purpose may be found on pages 377–384, vol. 19, of the Radiation Laboratory Series entitled "Waveforms," McGraw-Hill Co., 1949. A control circuit 9 receives the output of circuit 8 and is designed to produce an output signal only in the event a certain threshold point is reached by the instantaneous summation of pulses fed to coupling circuit 8. For example, the control circuit 9 may take the form of a monostable multivibrator controlling a fast closing delayed opening relay circuit. When the multivibrator is triggered upon the reception of a signal above a predetermined magnitude, the output of control circuit 9 actuates an indicating device 10, shown here as an electric lamp.

The output of the variable width pulse generator 6a is also applied to a coupling circuit 11, which may be similar to circuit 8. The output signals from circuit 11 are fed to a control circuit 12 which operates as does control circuit 9, but in this instance, the output signals are applied to an indicator 13, preferably of a different nature than indicator 10. For example, indicator 13 may take the form of a buzzer as shown. A control unit 14, with a calibrated control element 15 shown in Fig. 4, provides for adjusting various potentiometers, such as a potentiometer 25, to supply predetermined voltages to their associated variable width pulse generators.

Considering control unit 14 in more detail, an illustrative embodiment is presented in Fig. 4. The unit 14 is designed to furnish voltages to the pulse generators for simultaneously controlling the width of the generator output pulses. Through such control, the trailing edges of pulses from the various generators will coincide in time when the detected sound waves have a predetermined bearing. Such generators may take the form of any well known type monostable multivibrator having means for varying the width of the essentially square wave output. For example, a type of multivibrator as shown and described at pages 162 to 163, 166 to 171, 190 to 195 of the above cited text, may be utilized. It is to be understood that other well known pulse circuits may also serve this function. A cam 16, positioned by a control element 15, determines the setting of potentiometers 25, 17, 18 and 19 located in the north, east, south and west channels respectively. These potentiometers, by varying the potentials applied to their respective generators, control the width of the output pulses. The control unit is not limited to the exact arrangement shown. For example, the cam 16 could be eliminated in favor of separately controlled calibrated potentiometers or multiple potentiometers with desired mathematical function windings on one shaft.

For convenience in describing the operation of the invention, it will be assumed that a sound wave is approaching the sound detector system from due north. Referring to Fig. 1, it is seen that north microphone 2 will be energized followed by the energization simultaneously of east and west microphones 3 and 5, followed by the energization of south microphone 4. Upon the reception by variable pulse generator 6a of a signal generated by north microphone 2 at time $t_1$, a rectangular signal 30, shown in Fig. 3a, will be generated and applied to peaking circuit 7. Circuit 7 generates pulses 31 and 32 corresponding in time to the leading and trailing edges of pulse 30. Similarly, signals from the east, west and south microphones are fed to their respective channels which produce rectangular pulses similar to 30 but of different duration. The corresponding peaking circuits generate sharp pulses similar to pulses 31 and 32. Since the sound waves are approaching from due north, the direction for which control unit 14 has been set, the rectangular pulses from each of the four multivibrators have coinciding trailing edges. Consequently, the sharp pulses such as 32 at time $t_2$, generated in response to such trailing edges, correspond in time. The rectangular pulses are applied to coupling circuit 11, and since they overlap and add, control circuit 12 energizes indicator 13. The trailing edge pulses are applied to coupling circuit 8 and since they correspond in time, control circuit 9 energizes indicator 10. Therefore, when the operator notices both light 10 flashing and indicator 13 buzzing, he will immediately know that sound waves are being received from the direction indicated by control element 15.

From the foregoing description, it is seen that the operator may manually position control element 15 until both indicators are simultaneously operated and at such position the bearing of the detected sound waves may be directly read. The control element 15 may also be set to a predetermined direction to provide for indicating the reception of sound waves having such predetermined bearing.

To further clarify the operation of the system, assuming that control element 15 is set due north and a sound wave is received from the east, rectangular pulses will be generated by the multivibrators in response to signals from the microphones as shown in Fig. 3b. Corresponding sharp pulses will also be generated by the various peaking circuits. It is obvious that the rectangular pulses overlap so that indicator 13 will be energized, since control circuit 12 will be triggered. However, the trailing edges of the rectangular pulses do not coincide, so that the pulses from the peaking circuits do not add. Therefore, indicator 10 is not energized.

The control unit 14 may be designed so that indicator 13 will be energized when, for example, sound waves are received from only the 90° quadrant between north and east or the 180° quadrant between east, north, and west microphones. This is purely a matter of choice in the individual system and indicator 13 may be used as a coarse control with the indicator 10 being used as a fine indicator to obtain the exact bearing of the sound waves.

While a specific embodiment of the invention has been illustrated and described, it is obvious that modifications may fall within the spirit of the invention.

What I claim is:

1. A sound detecting system comprising, a plurality of spaced microphones, each of said microphones coupled to a variable width pulse generator, a control unit connected to vary the width of pulses from each of said generators, indicator means responsive to coincidence of some portions of said pulses from said generators for exciting said indicator means when said microphones are energized in a predetermined sequence.

2. A system as in claim 1 in which said indicator means comprises a plurality of indicators each responsive to coincidence of different portions of said pulses.

3. A sound detecting system comprising, a plurality of spaced microphones, two indicators, a control circuit for energizing each indicator, said control circuits being connected to receive variable width pulses generated in response to signals from said microphones and responsive to coincidence of different portions of said pulses, and a control unit operative to vary the width of said pulses so that signals from said microphones will energize said control circuits and said indicators when sound waves are received from a predetermined direction.

4. A system for detecting sound waves comprising, a plurality of spaced microphones associated with a like number of pulse generators, said generators responsive to signals from said associated microphone for generating pulses, means for controlling the width of said pulses from said generators so that the trailing edges of pulses generated in response to the same sound waves may coincide in time if said waves arrive from a predetermined direction, indicator circuits, and means responsive to pulses with coinciding trailing edges for energizing said indicator circuits.

5. A system for detecting sound waves comprising, a plurality of spaced microphones, each of said microphones coupled to a pulse generator, means for varying the width of pulses from said generators, two indicators, first circuit means responsive to said pulses for energizing one of said indicators when said pulses are generated in response to signals from said microphones having a first predetermined time relationship, second circuit means responsive to said pulses for energizing the other of said indicators when said pulses are generated in response to signals from said microphones having a second predetermined time relationship so that both of said indicators are energized upon the reception of sound waves from an exact predetermined direction.

6. A system for detecting sound waves comprising, a plurality of spaced microphones, each of said microphones coupled to a pulse generator, said generators being controlled by a control unit, to vary the time from an input from the microphone to the trailing edge of said pulses, a pair of control circuits each associated with an indicator, one of said control circuits responsive to first pulses from said generators for energizing said associated indicator when said first pulses have a predetermined time relationship, means responsive to said first pulses from said generators for forming second pulses coinciding in time with said trailing edge of said first pulses, the other of said control circuits responsive to said second pulses for energizing said associated indicator when said second pulses coincide in time whereby one of said indicators is energized upon the reception of sound waves from a relatively large sector and both of said indicators are energized upon the reception of sound from a relatively small sector.

7. A system as defined in claim 6 wherein said control unit includes mechanical means for varying electrical means to determine the width of said first pulses.

8. A system as defined in claim 6 wherein said control unit includes a cam and a cam follower for controlling an electrical element in each of said generators for determining the width of said first pulses.

9. A system for detecting sound waves comprising a plurality of spaced microphones, each of said microphones coupled to a variable width pulse generator, a control unit for varying the width of pulses from each of said generators, a pair of control circuits each associated with an indicator, one of said control circuits responsive to said variable width pulses for energizing said one associated indicator when said variable width pulses have a predetermined time relation, a peaking circuit responsive to said variable width pulses for forming sharp pulses coinciding in time with the trailing edges of said variable width pulses, the other of said control circuits responsive to said sharp pulses for energizing said other associated indicator when said sharp pulses coincide in time whereby said one indicator is energized upon the reception of sound waves from a relatively large sector and both of said indicators are energized upon the reception of sound waves from a relatively small sector.

10. A system as defined in claim 9 wherein said control unit includes mechanical means for varying electrical means to determine the width of said first pulses.

11. A system as defined in claim 9 wherein said control unit includes a cam and a cam follower controlling an electrical element in each of said generators for determining the width of said first pulses.

12. A system for detecting sound waves comprising, a plurality of spaced microphones associated with a like number of pulse generators, said generators responsive to signals from said associated microphones for generating pulses delayed in time from said signals, means for controlling the delay in time between said signals and said pulses, so that said pulses may coincide in time if said waves arrive from a predetermined direction, an output circuit, and means responsive to pulses coinciding in time for energizing said output circuit.

13. A system for detecting sound waves comprising a plurality of spaced microphones associated with a like number of pulse generators, said generators responsive to signals from said associated microphones for generating pulses, means for controlling the width of said pulses from said generators, so that particular portions of said pulses may coincide in time if said waves arrive from a predetermined direction, an output circuit, and means responsive to said portions coinciding in time for energizing said output circuit.

References Cited in the file of this patent

UNITED STATES PATENTS 2,434,644  Fairweather _____ Jan. 20, 1948